United States Patent [19]

Barnes

[11] Patent Number: 5,678,189
[45] Date of Patent: Oct. 14, 1997

[54] COMMUNICATIONS SYSTEM AND COMMUNICATIONS UNIT FOR COMMUNICATING OVER A BASE SET OF CHANNELS AND AN EXTENDED SET OF CHANNELS

[75] Inventor: Nigel Everard Barnes, Basingstoke, United Kingdom

[73] Assignee: Motorola, Inc., Schaumburg, Ill.

[21] Appl. No.: 556,867

[22] Filed: Nov. 2, 1995

Related U.S. Application Data

[63] Continuation of Ser. No. 142,305, filed as PCT/EP93/00653, Mar. 18, 1992, published as WO93/20624, Oct. 14, 1993, abandoned.

[30] Foreign Application Priority Data

Mar. 28, 1992 [GB] United Kingdom ............... 9206828

[51] Int. Cl.⁶ ..................................................... H04Q 7/20
[52] U.S. Cl. ........................... 455/34.1; 455/54.1; 379/61
[58] Field of Search ............................. 455/33.1, 34.1, 455/34.2, 54.1, 54.2, 56.1, 71, 72; 379/59, 61

[56] References Cited

U.S. PATENT DOCUMENTS

| | | | |
|---|---|---|---|
| 4,549,303 | 10/1985 | Gutleber . | |
| 5,034,993 | 7/1991 | Sasuta et al. | 455/34.1 |
| 5,119,397 | 6/1992 | Dahlin et al. | 455/33.1 |
| 5,218,630 | 6/1993 | Patsiokas et al. | 455/34.1 |
| 5,229,995 | 7/1993 | Strawczynski et al. | 455/34.1 |
| 5,276,908 | 1/1994 | Koohgoli et al. | 455/34.1 |
| 5,345,597 | 9/1994 | Strawczynski et al. | 455/34.1 |

FOREIGN PATENT DOCUMENTS

| | | |
|---|---|---|
| 0205949 | 12/1986 | European Pat. Off. . |
| 0282087 | 9/1988 | European Pat. Off. . |
| 0308253 | 3/1989 | European Pat. Off. . |
| 8303505 | 10/1983 | WIPO . |

*Primary Examiner*—Edward F. Urban
*Attorney, Agent, or Firm*—Heather L. Creps

[57] ABSTRACT

A communications system having a base station and a handset, capable of communicating over a base set of communication channels. Selecting one of the base channels for establishing communication. The handset sending a message, informing the base station, if it is capable of communicating over any extended set of communication channels, beyond the base set of channels, and if so, where the extended set of channels are located. The base station sends a message to the handset, informing the handset whether the base station has extended channel capability. If the base station has extended channel capability, the handset tunes its front end filters to match the indicated spectrum from the base station.

6 Claims, 3 Drawing Sheets

COMMUNICATIONS SYSTEM AND COMMUNICATIONS UNIT FOR COMMUNICATING OVER A BASE SET OF CHANNELS AND AN EXTENDED SET OF CHANNELS

This is a continuation of application Ser. No. 08/142,305, filed as PCT/EP93/00653, Mar. 18, 1992, published as WO93/20624, Oct. 14, 1993 and now abandoned.

BACKGROUND OF THE INVENTION

This invention relates to a communication system, such as a telepoint system, comprising a base station and a handset and communicating therebetween over a set of radio channels. The invention is particularly applicable to Second Generation Cordless Telephony (CT2) Common Air Interface (CAI) systems, but can equally apply to other similar systems, for example DECT.

SUMMARY OF THE PRIOR ART

As far as CT2 systems are concerned, CT2 has been allocated 4 MHz of bandwidth between 864.1 and 868.1 MHz; this provides 40 communications channels spaced at 100 kHz intervals. This common band of spectrum has been allocated across most of Europe and in several territories in the Far East specifically for CT2 CAI services. This allows manufacturers to address a truly world market, and for travelling users to use their personal cordless handsets in many territories around the world, as the frequencies are common in most of these territories; this aspect of the service is called international roaming. In several of these territories, it is expected that in due course high user densities will result in disruption and interference problems, so it is likely that extra neighbouring spectrum will be made available to expand the number of channels. However, it is not certain that the same amount of added spectrum will be made available in all territories, and that the added spectrum will be always above, or always below, the existing allocation. One of the primary benefits of a common interface standard is commonality and inter-operation of equipment, and variations in the frequency bands militate against this.

The CT2 CAI specification was specifically designed for 40 channels, and much of the system timing aspects are determined by this fact; it would not be a trivial exercise to alter the standard to allow it to access more channels. In CT2, each of the 40 channels is equally available to equipment using the service, which then means that when selecting a channel the handset (or base station) is required to scan all 40 channels in order to determine which channels are free before selecting one over which to establish a communications link to the base station (or handset). The timing of this channel scanning is central to the design of the CAI standard, and is central to the speed with which links can be established. Simple expansion of the number of channels available would considerably increase the time taken to establish a communications link.

One solution has been proposed that relies on common signalling channels (CSCs) to allow 8 MHz of spectrum (or possibly more) to be used. In this design, specific channels are set aside as CSCs which are not used for communications. A handset (or base station) wishing to make a call uses the CSC to contact a base station (or handset) initially, and then after some negotiation, the two ends mutually agree a communications channel and switch to it. This solution could, in theory, be applied world wide. However in practical terms it would not, as it would be impossible for all territories to agree which specific channels should be set aside as CSCs on a world wide basis. In addition, CSCs add significant complexity to the system design and implementation.

In the field of trunking radio, before the advent of local oscillator synthesizers, trunked two-way radios used a fixed set of crystal oscillators providing typically 5 channels. When synthesizer radios were introduced, it became possible to operate on many more channels and situations arose where some radios on a system had only a 5-channel capability and other radios had more. When a synthesizer radio made a request for a channel, the base station needed to know whether the whole fleet of which that radio was a member had the capability of communicating beyond 5 channels. This problem was solved by programming in the base stations such that when a synthesizer radio made a request for a channel, the base station noted the ID of the requesting radio and was preprogrammed with information as to whether all other radios in the same fleet were synthesizer radios. If they were, the base station could set up a channel outside the base set of 5 channels, whereas if one or more members of the fleet had only a 5-channel capability, the base station allocated one of those 5 channels to the fleet. By contrast to trunking systems, in the field of telepoint, it is not practical to program base station with information as to the capability of handsets. This is because a typical telepoint system in a given country may comprise several thousand base stations and several hundreds of thousands of handsets. Moreover, it would be desirable to have the flexibility to allow a visiting handset, which may even be from a different country, to be fully compatible with the system and allow full flexibility when operating on the system, without the need for preprogramming in the system.

There is a need for a more flexible telepoint system having the built-in capability of using different channel allocations in different countries with a minimum of system overhead information for implementation.

SUMMARY OF THE INVENTION

According to the invention, a communications system is provided, such as a telepoint system, comprising first and second communication units, e.g. a handset and a base station or vice versa, having means for communicating over a base set of communications channels, means for selecting one of said base set for establishing communication and means in said first unit for communicating to said second unit information as to capabilities of said first unit when communication has been established, characterised in that said means in said first unit for communicating said information comprise means for informing the second unit of the first unit's extended channel capability and the spectral location of the extended set of channels.

In this manner, the two units can communicate over the base set of channels and, by means of a single brief message, the second unit can learn of the first unit's extended channel capability and can make use of the extended channels if it also has a communication capability in at least some of those channels.

Where the second unit also has means for communicating over an extended set of communication channels, it may inform the first unit of its intention to use the first units extended sets of channels, thereby avoiding ambiguity at the first unit when a channel grant command is received from the second unit. If, on the other hand, the second unit does not have the capability of communicating over an extended set of channels, it need not issue any confirmation and the two units can communicate over the base set of channels without any ambiguity at the first unit as to which set of channels is to be used.

If the first unit does not inform the second unit of any extended channel capability, then, as a "default" mode of operation, the units continue communication over one of the base set of channels.

Thus, a fully flexible telepoint system can be provided comprising base stations and handsets having extended channel capability together with base stations and handsets having no extended channel capability and built-in flexibility for any handset to communicate with any base station and the ability to make full use of extended channels where mutually available.

In a further aspect of the invention, a first unit is characterized by receiving information as to the presence and extent of a second unit's communications capability over the extended set of channels and selecting, in response to receipt of said information, a communications channel in said extended set of channels outside said base set of channels and transferring communication to said selected channel.

The channel lying outside the base set is selected in preference to a channel in the base set in order to keep the base set free for use by units not having the extended channel capability, unless the extended channels have already become relatively loaded with traffic.

Preferred embodiments of the invention will now be described, by way of example, with reference to the drawings.

DETAILED DESCRIPTION OF THE PREFERRED EMBODIMENT

Figure 1:
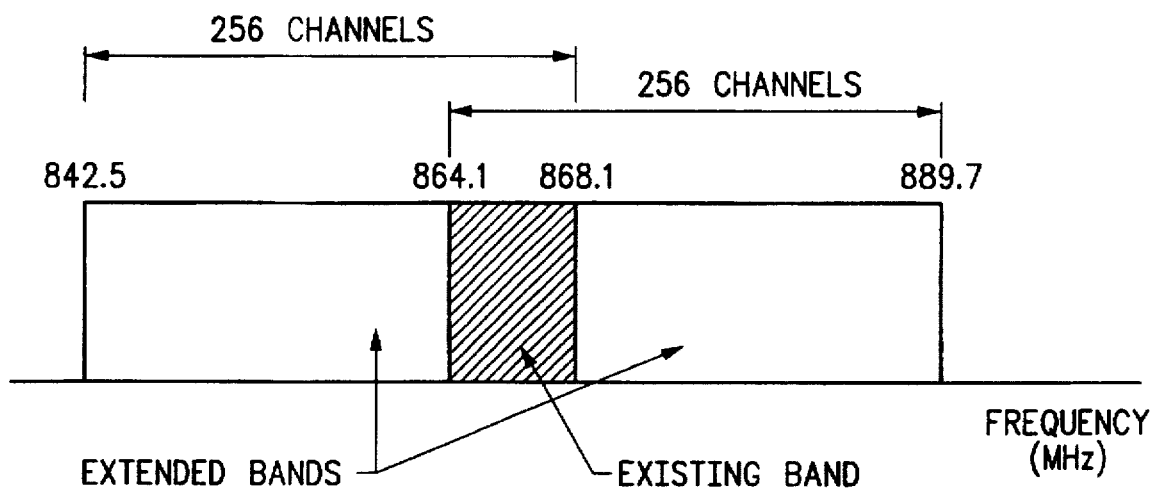
FIG. 1 shows a frequency spectrum showing a base set of communication channels and different possible sets of extended communications channels.

Referring to FIG. 1, there is shown a frequency spectrum diagram on which a shaded area illustrates 4 MHz of bandwidth between 864.1 and 868.1 MHz which has been allocated for CT2 communications in a number of different countries. This shaded area represents 40 communication channels spaced at 100 KHz intervals. To the left and right of this area are illustrated possible extended bands into which a further 216 channels may be allocated, giving a total 256 channels. 256 channels represents the maximum number of channels that can be identified using an 8-bit channel grant command. Depending on particular national considerations, any number of extended channels from 0 to 216 may be allocated to CT2 communications and these channels may be either to the left or to the right, or on both sides of the existing band of 864.1 to 868.1 MHz. For convenience of explanation, the case will be considered where a full 256 channels are available between 842.5 MHz and 868.1 MHz. The case will be considered where a base station has this capability and different handsets exist, some having extended channel capability and others being confined to the 864.1 to 868.1 MHz band.

Each handset (otherwise referred to as "Cordless Portable Part"—CPP) is factory programmed (in an EEPROM code plug) including whether or not it is capable of extended spectrum usage (i.e. the number of additional channels it is capable of employing) and, importantly, whether this extended spectrum usage is above or below the existing spectrum. This programming is dependent on the territory where the handset is sold and whether there is extended spectrum available or not in this territory. When a handset (or indeed a base station or "Cordless Fixed Part"—CFP) wishes to establish a link, it does so in a manner currently described in the interim European telecommunications standard I-ETS 131.300, by selecting a channel from one of the 40 currently available in the existing spectrum. Once a link has been established, the handset needs to indicate to the base whether or not it is capable of operating in extended spectrum and also how much extended spectrum it can access. This could be achieved by transmitting from the handset to the base station a message TERM_CAP as defined in I-ETS 131.300:1990 section 7.2.10. In the preferred embodiment, however, a modified message is used as is described below with reference to FIG. 6. To date the TERM_CAP message has comprised 9 octets and has been used to convey capabilities of the handset signifying: codec type; display capabilities; high-speed signalling capabilities; manufacturer; model number; preferred authentication algorithm and authentication algorithm capability. In various embodiments of the present invention, a further 2 octets are added, for example as illustrated in FIG. 2.

Figure 2:
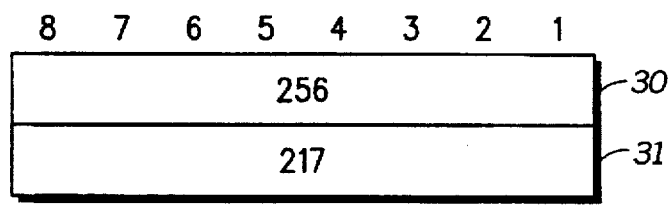
FIG. 2 shows a part of a message transmitted from a handset to a base station in accordance with a first embodiment of the invention.

Referring to FIG. 2, the first additional octet 30 indicates the total number of channels that the handset can use, in this case 256. The second additional octet 31 indicates the channel number that the handset assigns to what is channel 1 of the base set. In this case, the first channel of the shaded band of FIG. 1 (i.e. at 864.1 MHz) is channel 217 of the extended set of channels between 842.5 MHz and 868.1 MHz. In this manner, the handset indicates to the CFP in a clear and concise manner how many channels it can use and where these extra channels are relative to the existing band. In this case the extra channels are below the existing band, but equally the flexibility is provided for the channels to be above or below the existing band.

In all cases it is assumed that the extended bands are adjacent to the existing band. This is not essential, but if this were not the case, such a concise presentation of the information would not be possible.

The base station sends a message BAS_CAP to the handset, as defined in I-ETS 131.300:1990 section 7.2.11. To date this BAS_CAP message has comprised 5 octets indicating: intercom capability; display capability; high speed multiplexing capability; manufacturer; type and ISDN/non-ISDN. In accordance with various embodiments of the present invention, a further two octets are added containing information in the same format as that of FIG. 2 indicating the extended channel capability of the base station.

This modified BAS_CAP message has two purposes. One purpose is to let the handset know that extended operation is possible at the base and to confirm to the handset that future channel allocation commands from the base station will use a new channel numbering as defined by the TERM_CAP message previously sent by the handset. This informs the handset whether to use channel numbering from 1 to 256 in the extended band or from 1 to 40 in the existing band. The other purpose of the modified BAS_CAP message is to allow electronic tuning of front end filters in the handset so as to match the spectrum indication from the base station, and thus reduce potential blocking from "out of band" interference. "Out of band" interference is otherwise a particular problem when a handset has roamed to a geographical area where there are other transmissions, e.g. TV broadcast transmissions, in that handset's extended band, or part of its extended band.

Figure 3:
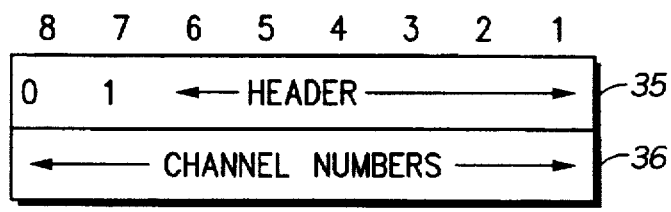
FIG. 3 shows a part of a message transmitted from a base station to a handset in accordance with the first embodiment of the invention.

If the base station is capable of matching the handsets indicated extended spectrum capabilities (it may not be able to if the handset is a roamer, or may only partly match the handsets capabilities, or equally the handset may only partially match the base stations capabilities), then the base station sends a modified re-establish supervisory message to the handset. This message is modified from that defined in I-ETSI 131-300, for example as shown in FIG. 3.

The modified re-established supervisory message uses the message "identifier" defined in I-ETSI 131-300, but is two octets in length. The first two bits of the first octet 35 are set at "01" defining the message as a re-establish message. (To be precise, the first three bits define the type of message but 010 and 011 are both reserved for re-establish. 010=re-establish on one of channels 1–32 as defined in the remaining 5 bits and 011=re-establish on one of channels 33–40 as defined in the remaining 5 bits.) The remaining 6 bits of the first octet are indicated in FIG. 2 as "Header" and have the following meaning. If Header=0, this is an instruction to the handset to re-establish on the current channel and in this case the Channel Number of the second octet 36 is meaningless.

If the Header field contains a value between 1 and 40, the Channel Number field 36 contains the absolute channel number at the handset from which scanning for a free channel is to commence, and the Header indicates the number of channels over which to scan. This information may also be used by the handset to retune its front end receiver to cover only that part of the spectrum indicated.

If the Header field contains the value 63, the Channel Number field contains the absolute channel number at the handset on which to re-establish immediately, without scanning. This situation presupposes that the base station is aware that the channel is free.

Once the channel on which communication is to take place has been selected by the above exchange of messages, the two units switch to a logical data channel for traffic communication, generally in the form of digital encoded speech. This channel is designated as MUX1.2 or MUX1.4 (depending on whether there are two or four out-of-band signalling bits). This is further described in I-ETSI 131.300 and in European patent application EP0380372A.

If one or other unit cannot support extended channel communication (indicated by the lack of additional fields in either TERM-CAP or BAS-CAP), the CAI operation remains exactly as currently defined and the existing channel re-establish supervisory message is interpreted as currently defined. Only the existing 40 channels are available and a channel numbering remains as currently defined. Neither end need use the modified re-establish messages and neither will expect to receive the modified re-establish message.

If both ends are capable of extended CAI spectrum, operation (which will be referred to as ECAI), then only the modified supervisory message is used, and channel numbering adopted between the units is the absolute channel numbering as seen at the handset. Thus, even if both ends cannot use ECAI, due to expanded use mismatch, then the base shall use the modified supervisory message to instruct the handset to re-establish on the existing channel or one of the 40 available channels.

Figure 4:
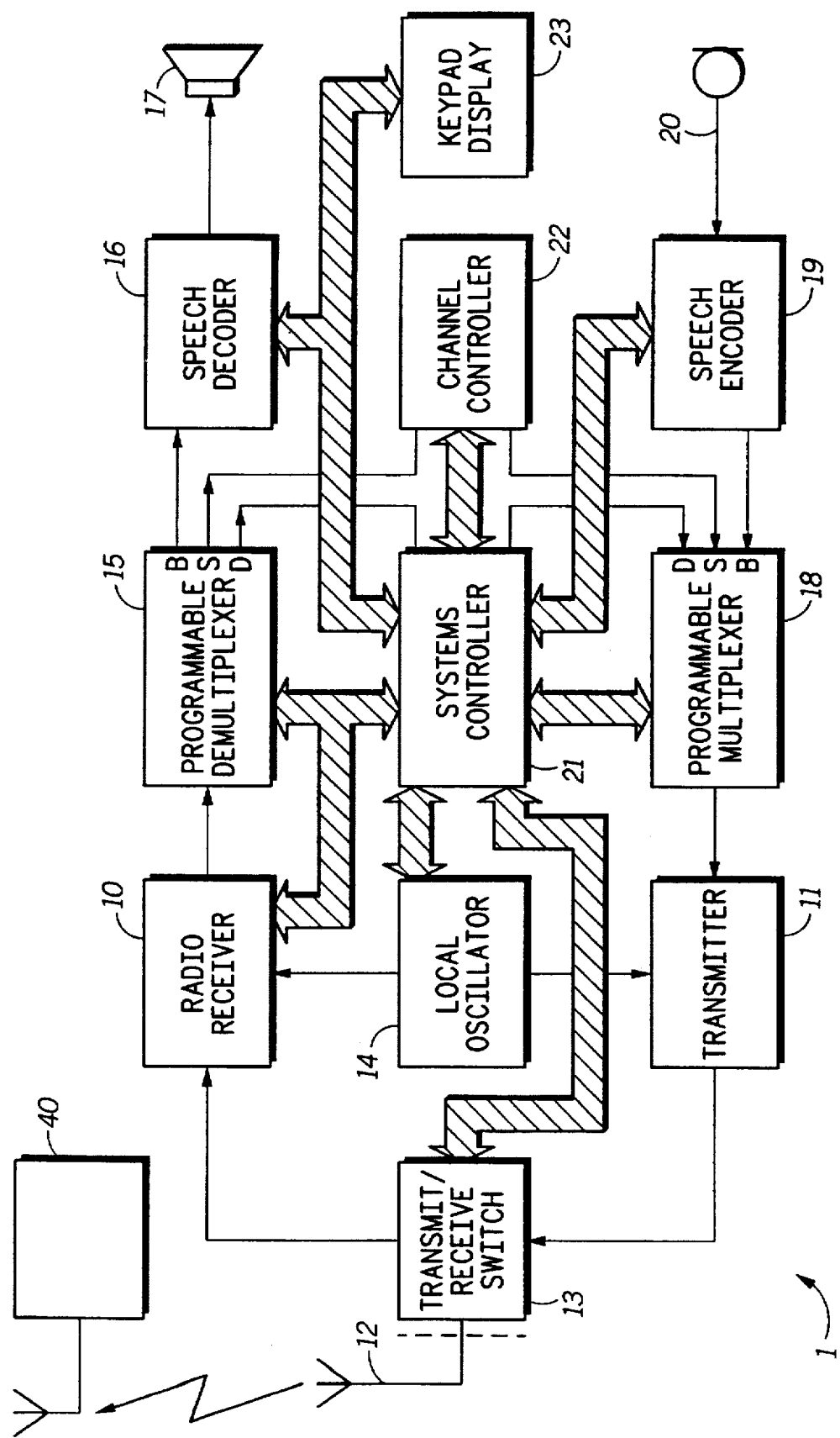
FIG. 4 shows a block diagram of a handset in accordance with the preferred embodiments of the invention.

Referring to FIG. 4, details of a handset 1 are shown with features included to take advantage of the above described exchange of messages. The handset of FIG. 4 comprises a radio receiver part 10 and a transmitter part 11 coupled to an antenna 12 by means of a transmit/receive switch 13. A local oscillator 14 provides an RF carrier frequency signal to the receiver part 10 and the transmitter part 11. Coupled to the receiver part 10 is a programmable demultiplexer 15, a speech decoder 16 and an earpiece 17 and coupled to the transmitter part 11 is a programmable multiplexer 18, a speech encoder 19 and a microphone 20. The handset is controlled by a system controller 21 and a channel controller 22 and has a keypad and an optional display 23. In operation, speech input to the microphone 20 is encoded by the encoder 19 and multiplexed into a logical data channel (B channel) by the the multiplexer 18, modulated onto a carrier signal in the transmitter part 11 and amplified for transmission and transmitted through the antenna 12. A received signal is received on the antenna 12, passed through the switch 13 to the receiver part 10, where it is demodulated and, in the programmable demultiplexer 15, the encoded speech part is passed to the speech decoder 16, where it is decoded, converted to analog form and output through the earpiece 17. The channel controller 22 provides synchronization using a logical S channel and the system controller 21 receives and transmits signalling data on a logical D channel. It is the system controller 21 that generates the message TERM_CAP and interprets the message BAS_CAP. In FIG. 4, a base station 40 is shown of substantially similar design and construction as the handset, and having a connection to a telephone network and other features standard in the art.

In FIG. 4, there is shown a bus 25 connected between the system controller 21 and the radio receiver part 10. This bus is provided for control of a tunable filter (not shown) in the radio receiver part 10. When the system controller 21 has received the message BAS_CAP from a base station and has identified the upper and lower limits of the base station's available band, the controller 21 sets the upper and lower limits of the filter in the receiver part 10 to match the limits of the base station's capability. Thus, a uniform design of handset can be manufactured for use anywhere in the world on which the base set of 40 channels for CAI have been adopted, with the flexibility of filtering out adjacent signals depending on the channels allocated in the country in which the handset is being used.

Figure 5:
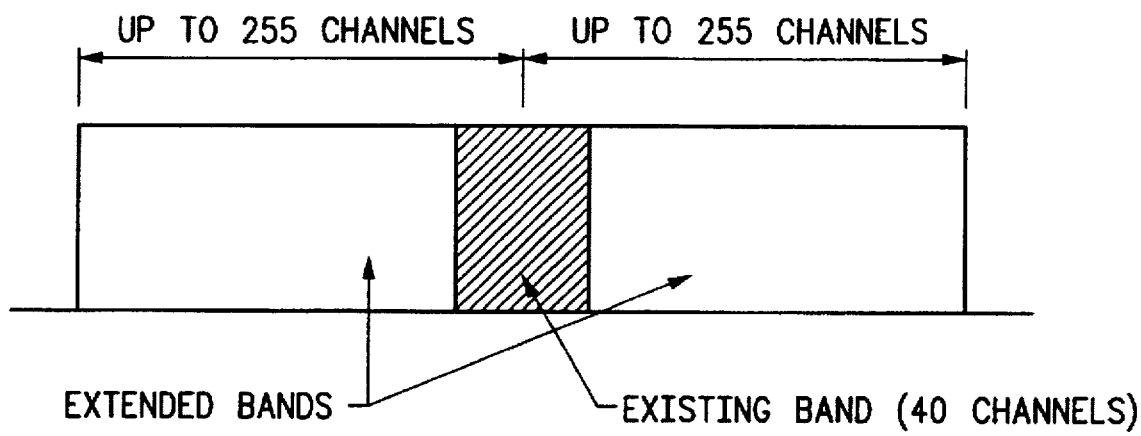
FIG. 5 shows a frequency spectrum arrangement alternative to that of FIG. 1.

Referring to FIG. 5, a preferred arrangement of base and extended channels is shown, in which the centre channel (channel 20) of the shaded set of 40 existing channels (the "base set") is used as a reference point. A handset communicates to a base station the number of channels it is capable of using above and below this reference channel. This may be ±255 channels, allowing a total capability of 510 channels.

Figure 6:
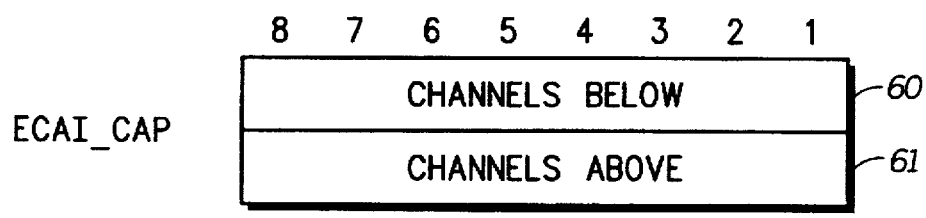
FIG. 6 shows a message alternative to that of FIG. 2.

The handset communicates its capability using the ECAI_CAP message shown in FIG. 6, in which the first octet 61 indicates the number of channels the handset is capable of using below reference channel 20 and the second octet 62 indicates the number of channel available above that channel.

Figure 7:
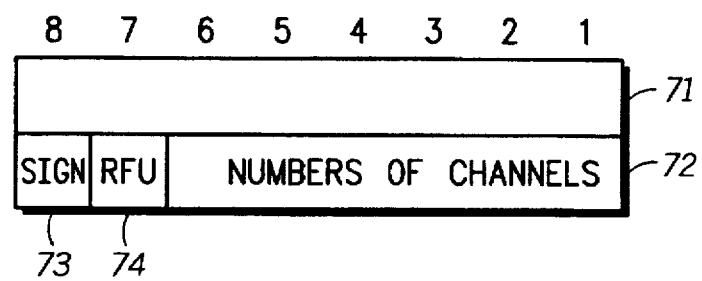
FIG. 7 shows a message alternative to that of FIG. 3.

The base station responds with the message of FIG. 7 in which the first octet 71 indicates the location of the channel to be considered the starting channel in terms of the number of channels separation from the reference channel and the eight bit 73 of the second octet 72 indicates a sign (plus or minus) indicating whether the starting channel is above or below the reference channel. The seventh bit of the second octet is reserved for future use (RFU) and the first to sixth bits of the second octet indicate the number of channels to be used (up to 40).

I claim:

1. A communications system comprising:

a first communication unit and a second communication unit each having means for communicating over a base set of communications channels;

means for selecting one communications channel of said base set of communications channels for a communication;

means, in said first communication unit, for communicating to said second communication unit information as to capabilities of said first communication unit;

said first communication unit having means for communicating over a first further set of communications channels in addition to said base set of communications channels;

said second communication unit having means for communicating over a second further set of communications channels in addition to said base set of communications channels;

said second communication unit having means for comparing the second further set of communications channels to the first further set of communications channels; and means for instructing said first communication unit as to which channel or channels is/are to be used by said first communication unit for the remainder of the communication if the comparison indicates a common channel or channels in the first and second further sets; and means for continuing communication on said base set of communication channels in response to said means for comparing determining an absence of a common channel.

2. A system according to claim 1, wherein said means for instructing said first communication unit comprises means for transmitting an indication of a total number of channels to be used by the first communication unit and an indication of the location of those channels relative to a reference channel location.

3. A first unit of a communications system having means for communicating with a second unit over a base set of communications channels, means for selecting one of said base set of communications channels for establishing communication with said second unit and means for communicating to said second unit information as to the capabilities of said first unit when communication has been established, comprising:

means for communicating over an extended set of communications channels in addition to said base set of communications channels;

wherein said means in said first unit for communicating said information comprises means for informing said second unit of said first unit's extended channel capability and the spectral location of the extended set of communications channels;

means for receiving from said second unit information as to said second unit's channel capability; and adjustable tuning means responsive to said means for receiving said information, for filtering out received signals outside said second unit's channel capability and forming a set of common communications channels;

means for communicating on one of the extended set of communications channels in response to formation of said set of common communications channels including at least one channel from the extended set of communications channels; and means for communicating on one of the base set of communications channels in response to formation of said set of common communications channels absent at least one channel from the extended set of channels.

4. The unit of a communications system according to claim 3, wherein said extended set of communications channels is a spectrally continuous series of channels.

5. The unit of a communications system according to claim 4 wherein said means for informing said second unit as to the extended channel capability of said first unit comprises means for transmitting an indication as to a total number of channels over which said first unit has means for communicating and a channel number for a channel of said spectrally continuous series of channels having a predetermined frequency.

6. A unit of a communications system according to claim 3, wherein said extended set of channels is a spectrally discontinuous series of channels.

* * * * *